No. 874,821. PATENTED DEC. 24, 1907.
A. E. AYER.
EDGE TRIMMING MACHINE.
APPLICATION FILED MAY 6, 1907.
2 SHEETS—SHEET 1.
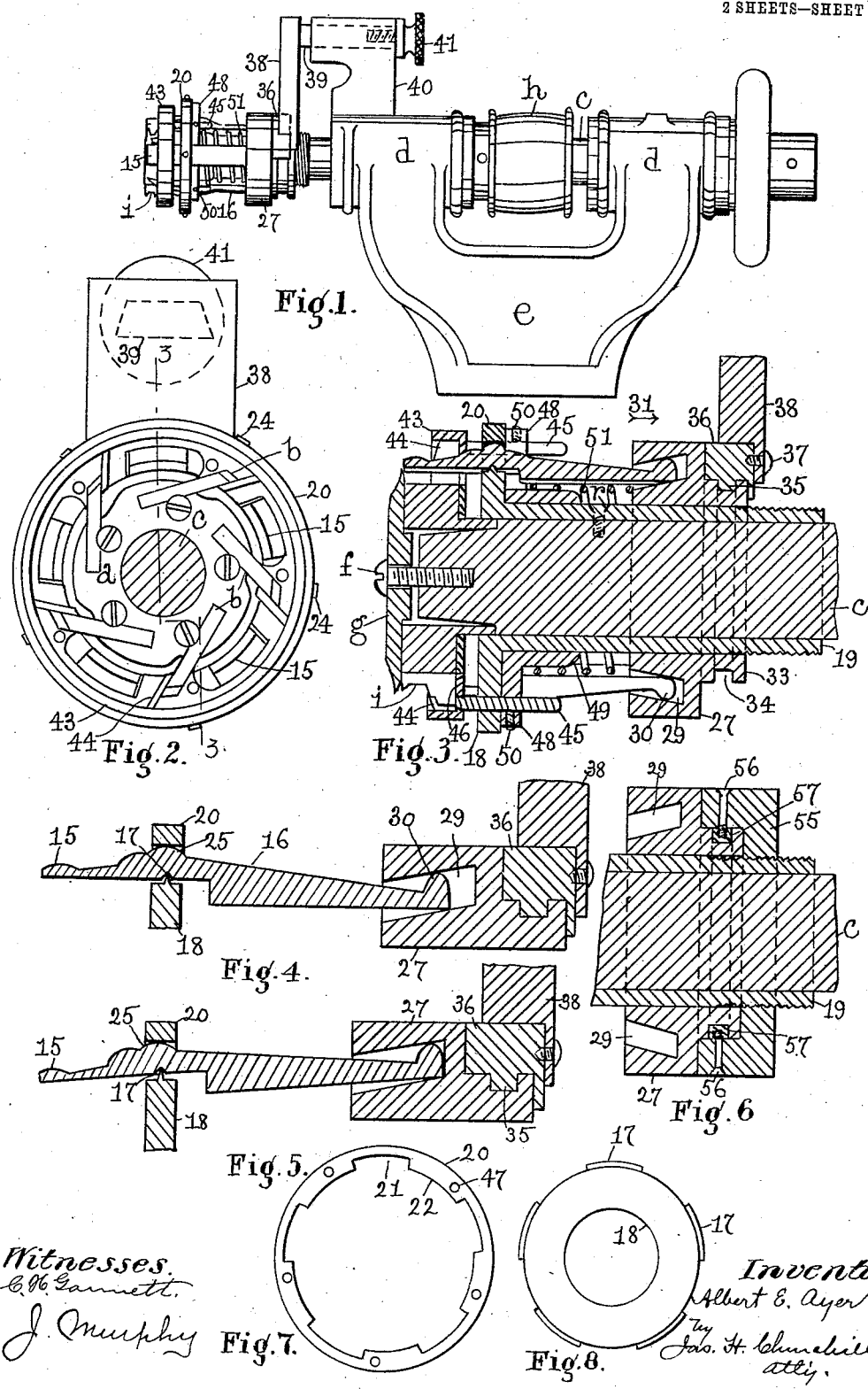
Witnesses
C. M. Gannett.
J. Murphy
Inventor
Albert E. Ayer
by Jas. H. Churchill
atty.

No. 874,821. PATENTED DEC. 24, 1907.
A. E. AYER.
EDGE TRIMMING MACHINE.
APPLICATION FILED MAY 6, 1907.

2 SHEETS—SHEET 2.

Witnesses.
C. H. Fawcett.
J. Murphy.

Inventor.
Albert E. Ayer
by Jas. H. Churchill
Atty.

UNITED STATES PATENT OFFICE.

ALBERT E. AYER, OF CHELSEA, MASSACHUSETTS, ASSIGNOR TO RUTH L. VOSE, OF BROOKLINE, MASSACHUSETTS.

EDGE-TRIMMING MACHINE.

No. 874,821.　　　Specification of Letters Patent.　　　Patented Dec. 24, 1907.

Application filed May 6, 1907. Serial No. 372,002.

*To all whom it may concern:*

Be it known that I, ALBERT E. AYER, a citizen of the United States, residing in Chelsea, in the county of Suffolk and State of Massachusetts, have invented an Improvement in Edge-Trimming Machines, of which the following description, in connection with the accompanying drawings, is a specification, like letters on the drawings representing like parts.

This invention relates to a machine for trimming the edges of the soles and heels of boots and shoes, and has for its object to provide a sectional bed or guard for the shoe to rest against while being trimmed, which guard is adjustable to vary the depth of cut of the knives. Provision is made for effecting the adjustment of the guard while the machine is in operation.

The invention further consists in providing a feather edger, which is adjustable automatically and positively as will be described.

These and other features of this invention will be pointed out in the claims at the end of this specification.

Figure 9:
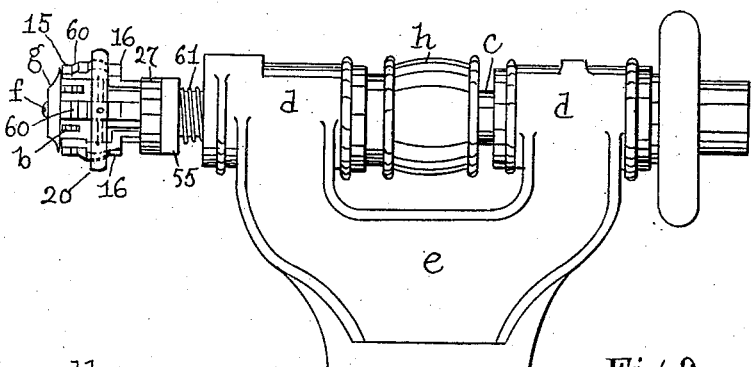
Figure 10:
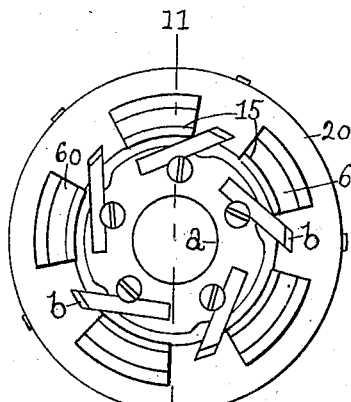
Figure 11:
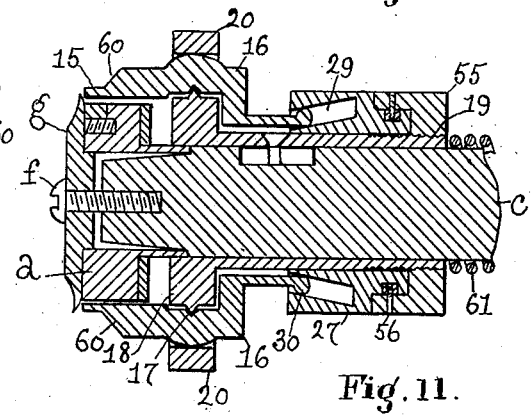
Figure 12:
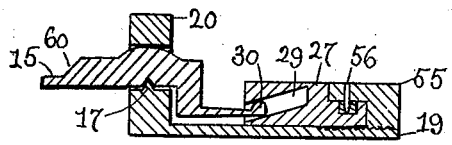
Figure 13:
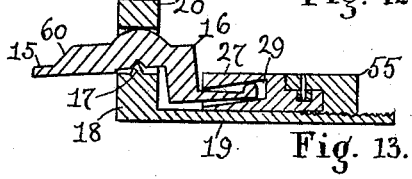

Figure 1 is an elevation of an edge trimming machine embodying this invention. Fig. 2, an end elevation of the machine shown in Fig. 1, looking toward the right. Fig. 3, a longitudinal section on the line 3—3, Fig. 2. Figs. 4, 5 and 6, sectional details to be referred to. Figs. 7 and 8, details in elevation to be referred to. Fig. 9, an elevation of a machine provided with a modified form of guard. Fig. 10, an end elevation of the machine shown in Fig. 9. Fig. 11, a longitudinal section on the line 11—11, Fig. 10, and Figs. 12 and 13, sectional details to be referred to.

Referring to the drawing $a$ represents a rotary cutter carrier having a series of cutters or knives $b$ extended from the periphery of the carrier $a$ at an angle thereto. The cutter carrier $a$ is mounted on a shaft $c$ rotatable in bearings $d$ in the framework $e$ of the machine, the said carrier being shown in the present instance as secured to the shaft by the screw $f$ extended through the shield $g$. The shaft $c$ may be rotated in any suitable manner as by a belt (not shown), which is passed about a driving pulley $h$ on said shaft. The machine as thus far described is well known and forms no part of the present invention, which relates to an adjustable guard or bed coöperating with the cutting edge $i$ of each knife or cutter $b$. To this end each cutter or knife $b$ has coöperating with it a bed or guard 15 forming part of a lever 16 extended substantially parallel with the shaft $c$ and pivotally supported on a knife edge or pivot projection 17, on the periphery of a disk or an annular flange 18 on a sleeve 19, which is fastened to the shaft $c$ to rotate therewith as by the screw $r$ (see Fig. 3).

The guard levers 16 are retained on the disk or annular flange 18 by a ring 20 (see Figs. 2 and 7), which is provided on its inner circumference with recesses 21 and with projections 22, which coöperate respectively with the pivot projections 17 on the flange 18 (see Fig. 8) and with the periphery of said flange between adjacent pivot projections. The retaining ring 20 may be secured to the flange 18 by screws 24. The guard levers 16 may be provided with a curved or rounded exterior surface 25 opposite the pivot projections 17, so as to permit rocking movement of the said levers while holding the levers in engagements with their knife edges 17. Provision is made for tilting the guard levers on their pivots 17, which may be accomplished by a ring 27 loose on the hub or sleeve 19 and provided with a cam-shaped or inclined annular slot 29 in one face of said ring.

The annular slot 29 has extended into it the rear ends of the guard levers, which ends are provided with enlargements 30 to be engaged by the walls of the slot 29 as the ring 27 is moved longitudinally on the stationary sleeve or hub 19. When the ring 27 is moved backward or away from the cutter head and in the direction indicated by the arrow 31, Fig. 3, the inclined slot 29 acts on the guard levers to turn them on their pivot points and expand or move outward their free ends carrying the beds 15, so as to adjust the same with relation to the cutting edges $i$ of the knives and place them in such relation thereto as to diminish or reduce the depth of cut made by the knives. When the slotted ring 27, which may be termed the cam ring, is moved in the opposite direction or toward the cutter carrier, the rear ends of the levers are expanded and the front ends of the levers are contracted or moved toward the axis of the shaft $c$, after the manner represented in Fig. 5, thereby moving the beds or guards 15 away from the cutting edges $i$ of the knives to uncover them and enable a cut of greater depth to be made in the work.

In Figs. 1 and 3, provision is made for moving the actuating device or ring 27 longitudinally of the shaft while the machine is in operation, and for this purpose, the ring 27 is provided with an extension 33 having an annular groove 34, into which extends a projection 35 on a block 36, secured as by screw 37 to an arm 38 depending from a slide bar 39, which is fitted to slide in an upright 40 on the framework of the machine. The slide bar 39 may be moved by turning a thumb screw 41. The knives or cutters $b$ may have coöperating with them a feather edger, which may be made as herein shown and consists of a ring 43, preferably provided with lugs or projections 44 on its inner circumference, said ring being movable longitudinally of the shaft $c$ and guided in its movement by rods or pins 45, attached to the inwardly projecting lugs 46 on the ring and extended through suitable holes 47 in the retaining ring 20 for the guard levers and through radially extended arms or lugs 48 on a sleeve 49, which is loose on the stationary sleeve or hub 19 and is free to move longitudinally thereon, the rods 45 being secured to said radial arms by screws 50, which serve to fasten the feather edger in its adjusted position with relation to the knives. The feather edger 43 is held in yielding engagement with the work by a spring 51, which encircles the sleeve 19 and bears against the radial arms 48 and the cam ring 27.

In Fig. 6, I have shown another mechanism for adjusting the cam ring 27 on the sleeve or hub 19, which consists of a nut 55 in threaded engagement with the sleeve or hub 19 and connected by pins or screws 56 to a ring 57 loose in the groove 30 of the extension 33 of the cam ring 27.

I may prefer to make the feather edger 43, 44 separate from the guard levers, as shown in Fig. 1, but I do not desire to limit my invention in this respect, as the feather edger may be made part of the guard levers as represented in Figs. 9 to 13, wherein the feather edger is shown as an inclined surface 60 of the lever. In this case, the sleeve 19 carrying the guard levers 16 is loose on the shaft $c$ and is free to move longitudinally thereon against the action of the spring 61.

In operation with the apparatus shown in Fig. 1, the feather edger is adjusted and secured in its adjusted position by the screws 50, which is effected before starting the machine in operation, and while the machine is running, the bed 15 of the guard levers 16, may be adjusted with relation to the cutting edges $i$ of the knives by turning the screw 41. As the work varies in thickness the feather edger is moved longitudinally of the shaft $c$ in one direction by the work and in the other by the spring 51 or 61.

Claims.

1. In a machine of the class described, in combination, a rotary cutter carrier having a plurality of knives or cutters, a shaft on which said carrier is mounted to rotate therewith, a sleeve or hub on said shaft having an annular flange provided with a series of pivot projections, a plurality of levers pivoted on said projections, and having beds coöperating with said knives or cutters, a retaining ring for said levers, means to secure said ring to said flange, a ring having an inclined slot into which the said levers extend, and means to move said ring longitudinally of said shaft to rock the said levers on their pivots and thereby uncover more or less of the said knives, substantially as described.

2. In a machine of the class described, in combination, a rotary cutter carrier having a plurality of knives or cutters, a shaft on which said carrier is mounted to rotate therewith, a sleeve or hub on said shaft having an annular flange provided with a series of pivot projections, a plurality of levers pivoted on said projections and having ends coöperating with said knives or cutters, a retaining ring for said levers, means to secure said ring to said flange, a ring having an inclined slot into which the said levers extend, means to move said ring longitudinally of said shaft to rock the said levers on their pivots and thereby uncover more or less of the said knives, a feather edger ring coöperating with said knives and provided with pins or rods extended through said retaining ring, a sleeve loose on said hub and provided with radial arms, and means to secure said rods or pins to said arms, substantially as described.

3. In a machine of the class described, in combination, a rotary cutter carrier provided with a plurality of cutters or knives, guard levers extended between said cutters, a ring loosely mounted to slide bodily with relation to said levers and connected with the latter to turn the same by sliding movement of said ring, and means coöperating with said ring to slide it bodily toward and from the said levers to move the latter and uncover more or less of the cutters or knives while the machine is in operation, substantially as described.

4. In a machine of the class described, in combination, a rotatable cutter or knife, a guard lever coöperating therewith, a ring loosely mounted to slide bodily with relation to said lever and connected with the latter to turn the same by sliding movement of said ring, and means coöperating with said ring to slide it bodily toward and from the said lever to move the latter and uncover more or less of the cutter or knife while the machine is in operation, substantially as described 5. In a machine of the class described, in combination, a sleeve provided with a flange having a plurality of pivot projections, levers pivoted upon said projections, a retaining ring for said levers secured to said flange, and a slotted ring coöperating with said levers to turn them on their pivots, substantially as described.

6. In a machine of the class described, in combination, a sleeve provided with a flange having a plurality of pivot projections, levers pivoted upon said projections, means to retain said levers on said projections, and a slotted ring to turn said levers on their pivots.

7. In a machine of the class described, in combination, a rotary cutter provided with a plurality of cutters or knives, independently movable beds extended between said cutters or knives, a device loosely mounted to slide bodily with relation to said beds and connected with the latter to move the same by sliding movement of the said device, and means coöperating with said device to slide it bodily toward and from said beds and uncover more or less of the cutters or knives while the machine is in operation.

8. In a machine of the class described, in combination, a plurality of levers, means on which said levers are pivoted, and a ring movable longitudinally with relation to said levers and provided in its front face with a cam slot into which the rear ends of said levers are extended, substantially as described.

In testimony whereof, I have signed my name to this specification in the presence of two subscribing witnesses.

ALBERT E. AYER.

Witnesses:
JAS. H. CHURCHILL,
J. MURPHY.